(12) United States Patent
Raczuk

(10) Patent No.: US 9,878,429 B2
(45) Date of Patent: Jan. 30, 2018

(54) TUBE ASSEMBLY APPARATUS AND METHOD

(71) Applicant: Richard C Raczuk, Lake Havasu, AZ (US)

(72) Inventor: Richard C Raczuk, Lake Havasu, AZ (US)

(\*) Notice: Subject to any disclaimer, the term of this patent is extended or adjusted under 35 U.S.C. 154(b) by 548 days.

(21) Appl. No.: 13/947,973

(22) Filed: Jul. 22, 2013

(65) Prior Publication Data

US 2014/0020231 A1     Jan. 23, 2014

Related U.S. Application Data

(60) Provisional application No. 61/674,186, filed on Jul. 20, 2012.

(51) Int. Cl.
| | |
|---|---|
| *F16L 1/09* | (2006.01) |
| *B25B 1/24* | (2006.01) |
| *B25B 1/20* | (2006.01) |
| *B25B 1/10* | (2006.01) |
| *B25B 27/10* | (2006.01) |
| *F16L 33/207* | (2006.01) |

(52) U.S. Cl.
CPC ............ *B25B 27/10* (2013.01); *B25B 1/103* (2013.01); *B25B 1/20* (2013.01); *F16L 1/09* (2013.01); *F16L 33/2073* (2013.01); *B25B 1/2405* (2013.01); *B25B 1/2478* (2013.01); *Y10T 29/49826* (2015.01); *Y10T 29/49947* (2015.01); *Y10T 29/53* (2015.01); *Y10T 29/5367* (2015.01); *Y10T 29/53091* (2015.01)

(58) Field of Classification Search
CPC ......... Y10T 29/49899; Y10T 29/53091; Y10T 29/53; Y10T 29/5367; Y10T 29/49826; Y10T 29/49947; Y10T 279/1913; Y10T 279/17675; B25B 1/2478; B25B 1/2924; B25B 1/2405; B25B 5/02; B25B 27/10; B25B 1/20; B25B 1/103; B23B 31/16045; F16L 1/09; F16L 33/2073
USPC .............. 29/465, 466, 700, 721; 269/43, 45
See application file for complete search history.

(56) References Cited

U.S. PATENT DOCUMENTS

| | | | | |
|---|---|---|---|---|
| 2,878,026 A | * | 3/1959 | Pioch ...................... | B23B 31/36 279/110 |
| 3,132,673 A | * | 5/1964 | Bamford ................... | B27L 5/02 144/209.1 |
| 4,535,521 A | * | 8/1985 | VerPlanck ............... | B23P 19/06 29/235 |
| 4,619,446 A | * | 10/1986 | Yang ...................... | B23D 47/02 269/147 |

(Continued)

OTHER PUBLICATIONS

Configured definition Merriam-Webster; http://www.merriam-webster.com/dictionary/configure; p. 1; Jul. 26, 2016.*

*Primary Examiner* — Christopher Besler
*Assistant Examiner* — Bayan Salone
(74) *Attorney, Agent, or Firm* — Taft Stettinius & Hollister LLP

(57) ABSTRACT

The present disclosure provides an apparatus having a base with at least one guide formed along a length thereof. A fitting clamp and a tube clamp are coupled to the base and spaced apart from one another. A drive mechanism is operable for moving at least one clamp relative to the other clamp along the guide of the base so as to slidingly assemble a tube and fitting together.

19 Claims, 7 Drawing Sheets

(56) References Cited

U.S. PATENT DOCUMENTS

| | | | | |
|---|---|---|---|---|
| 6,152,435 A | * | 11/2000 | Snell | B25B 1/2452 |
| | | | | 269/268 |
| 6,325,366 B1 | * | 12/2001 | Kane | B23K 37/0533 |
| | | | | 219/60.2 |
| 7,293,765 B2 | * | 11/2007 | Hooper | B25B 1/103 |
| | | | | 269/246 |
| 7,451,968 B2 | * | 11/2008 | Geldert | B25B 5/163 |
| | | | | 269/258 |
| 8,646,765 B2 | * | 2/2014 | Caldarone | B25B 1/103 |
| | | | | 269/111 |
| 8,678,363 B2 | * | 3/2014 | Baker | B25B 1/103 |
| | | | | 269/43 |
| 2012/0068394 A1 | * | 3/2012 | Baker | B25B 1/103 |
| | | | | 269/45 |
| 2014/0020225 A1 | * | 1/2014 | Raczuk | B25B 27/10 |
| | | | | 29/428 |

* cited by examiner

TUBE ASSEMBLY APPARATUS AND METHOD

CROSS REFERENCE TO RELATED APPLICATIONS

The present application claims the benefit of U.S. Provisional Patent Application No. 61/674,186 filed Jul. 20, 2012, and is incorporated herein by reference.

TECHNICAL FIELD

The present invention relates to apparatus and methods for assembling a tube and a fitting together.

BACKGROUND

Assembling fittings, connectors or couplings and the like with a tube can be difficult in some aspects. For example, if the tube is flexible it may tend to bend or twist under the force required to seat the tube onto a fitting and if the tube is relatively stiff, it may break if not appropriately held and/or aligned with the fitting during assembly. Present approaches to assembling a fitting into the end of a tube suffer from a variety of drawbacks, limitations, disadvantages and problems including the length of time and potential for damage to the tube and/or fitting during the assembly process. There is a need for the unique and inventive assembly tool and method for installing fittings and tubes to one another.

SUMMARY

One embodiment of the present disclosure is a unique apparatus for assembling a tube and a fitting together. Other embodiments include apparatuses, systems, devices, hardware, methods, and combinations for the same. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
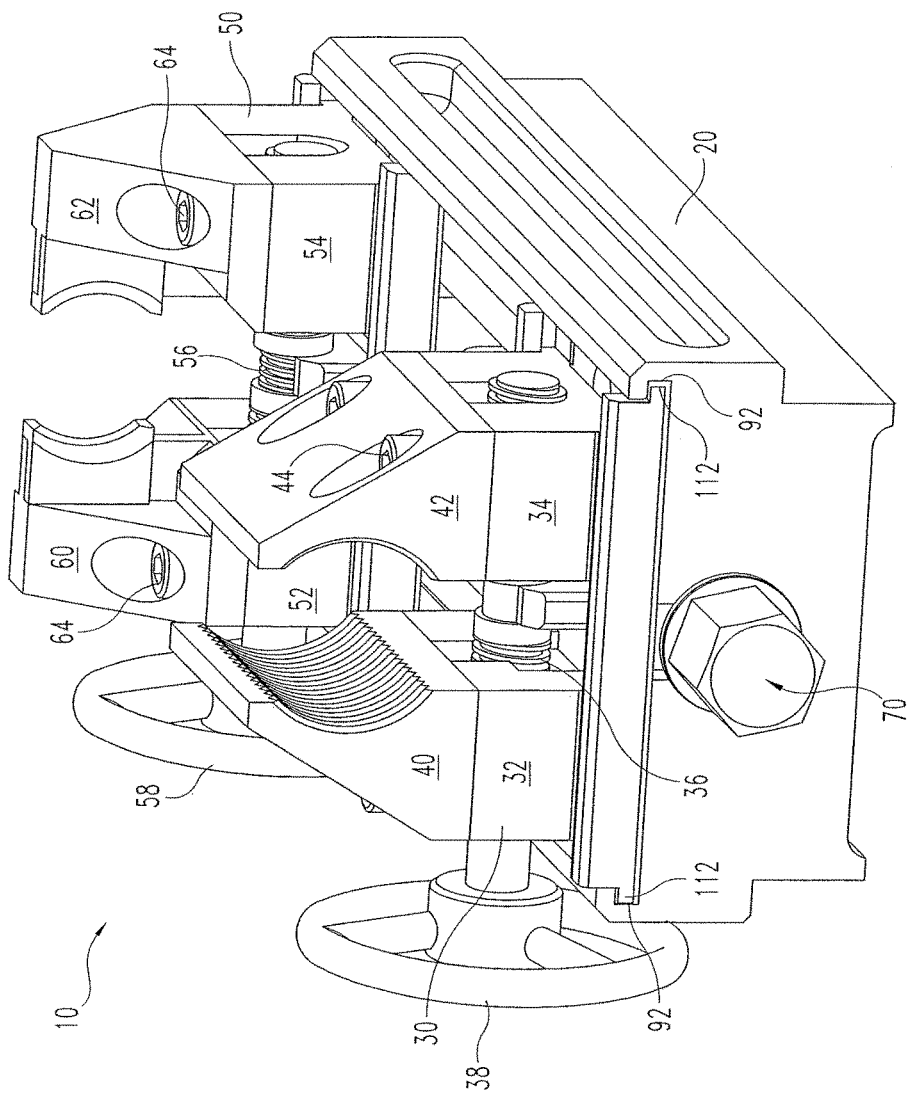
FIG. 1 is a top perspective view of a tube and fitting assembly tool according to one embodiment of the present disclosure.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A tube assembly apparatus 10 is illustrated in FIG. 1. The apparatus 10 includes a base 20 for slidingly supporting a tube clamp 30 and a fitting clamp 50. The tube clamp 30 includes a first pawl 32 and an opposing second pawl 34 that together form the actuation portion of the tube clamp 30. A tube clamp threaded rod 36 is operably engaged with the first pawl 32 and second pawl 34 such that rotation of the threaded rod 36 will cause the first pawl 32 and second pawl 34 to draw closer together or move apart from one another depending on the direction of rotation. A tube clamp wheel 38 can be connected to the tube clamp threaded rod 36 such that an operator can turn the threaded rod 36 by hand. While the illustrative embodiment shows a wheel as the actuation means for the tube clamp 30, it should be understood that any useable actuation form is contemplated by the present disclosure. For example, other actuation forms can include a single sliding bar as is conventional with some clamps or a nut that can be driven via a wrench or socket. Alternate actuation forms are also contemplated herein.

First and second opposing tube collets 40, 42 are attachable to the first and second pawls 32, 34, respectively. The tube collets 40, 42 are operable for engaging with a tube and will be discussed in more detail below. One or more fasteners 44 such as an internal threaded cap screw illustrated in this exemplary embodiment can be used to couple the tube collets 40, 42 with the tube pawls 32, 34, respectively. The tube collets 40, 42 are configured to be interchangeable such that variations in length, geometric shape and size can be appropriately matched for a particular size or type of tube.

Similarly to the tube clamp 30, the fitted clamp 50 also includes first and second pawls 52, 54 that are operably connected through a fitting clamp threaded rod 56, such that rotation of the threaded rod 56 will cause the first and second pawls 52, 54 to draw closer or move further apart from one another depending on the direction of rotation. First and second opposing fitting collets 60, 62 can be attached to the first and second fitting clamp pawls 52, 54 via one or more threaded fasteners 64. A drive actuator 70 can be coupled through the base 20 to one or both of the tube and fitting clamps 30, 50 to move the clamps 30, 50 toward or apart from one another as will be described in more detail below. The fitting collets 60, 62 are configured to be interchangeable such that variations in length, geometric shape and size can be appropriately matched for a particular size or type of fitting.

Figure 2:
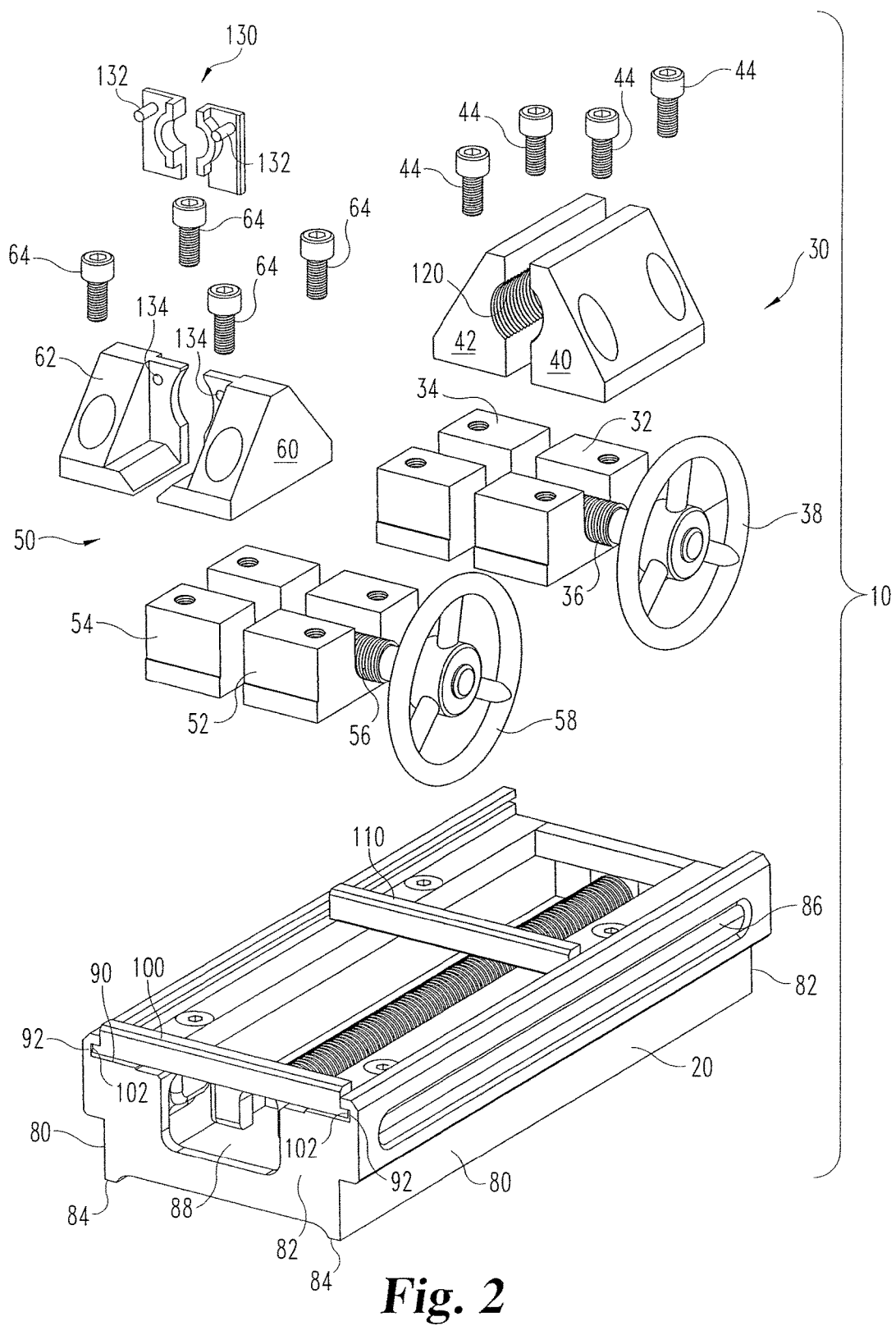
FIG. 2 is an exploded view of the assembly tool of FIG. 1.

Turning now to FIG. 2, an exploded view of the tube and fitting assembly apparatus 10 is shown and will be described in more detail. The apparatus base 20 includes a pair of side walls 80 that longitudinally extend along the length thereof. A pair of opposing end walls 82 extends between the side walls 80 of the base 20. The side walls 80 and end walls 82 can join to form a pair of support legs 84 to engage with a support surface (not shown) for which the tube assembly apparatus 10 can be positioned thereon. The side walls 80 can have an opening such as the elongated opening 86 shown in the illustrative embodiment. One or both of the end walls 82 can also have an opening 88 to provide access for assembly or repair of the apparatus 10 and/or provide space for moving parts to pass through as may be advantageous in some embodiments of the tube assembly apparatus 10. The base 20 can also include a top wall 90 for the clamps 30, 50 to operably engage therewith. A longitudinal groove 92 can be formed in the side walls 80 of the base 20 so as to permit contained sliding engagement of the clamps 30, 50 therewith. Although not shown in the illustrative embodiment, the base 20 can include features to releasably connect with a support surface (not shown) or the like.

A fitting clamp platform 100 can be configured to support the fitting clamp 50 to be releasably locked with the base 20, but permits the pawls 52, 54 to freely move toward or apart from one another as described above. A tongue 102 can extend from either side of the platform 100 to slidingly engage with the longitudinal groove 92 of the base 20. The groove 92 provides a guided path for the fitting clamp 50 while moving along the longitudinal length of the base 20 in some embodiments of the present disclosure. In other embodiments, the fitting platform 100 is placed in fixed position with respect to the base 20 and the tongue 102 of the fitting platform 100 merely aligns the fitting clamp 50 with the tube clamp 30. Once assembled in place, the fitting clamp platform 100 can be locked in place relative to the base 20 via conventional methods such as using one or more threaded fasteners (not shown in this embodiment). Alternatively, the platform 100 for the fitting clamp 50 can be slidingly engageable with the base 20 and connected to an actuator means as will be described in more detail below.

The fitting collets 60, 62 can be configured to receive a collet insert 130 that form a pair of opposing sides to contact and hold a fitting (not shown in FIG. 2). The collet insert 130 can include one or more projections 132 that engage through corresponding holes 134 formed in the collets 60, 62 of the fitting clamp 50. The collet inserts 130 can be constructed to be quickly and easily interchangeable such that fittings of different sizes, shapes and configurations can be accommodated with the fitting clamp 50. The collet insert 130 can be formed of any material that advantageously holds a fitting in place without damaging the external surface of the fitting. Materials for forming the collet insert 130 can include metals, plastics, composites, rubber, and the like. It is further contemplated that coatings to prevent wear, prevent corrosion and/or enhance gripping ability may be used on the fitting collets 60, 62, collet insert 130 or other locations as needed.

A tube clamp platform 110 is similarly constructed as the fitting clamp platform 100. The tube clamp platform 110 can include a pair of tongues 112 (best seen in FIG. 1) that extend outwardly to engage with the longitudinal groove 92 of the base 20. Similarly to the fitting clamp platform 100, the tube clamp platform 110 supports the tube clamp 30 in a manner that permits the opposing pawls 32, 34 to move with respect to one another and in some embodiments can move longitudinally with respect to the base 20. The tube clamp collets 40, 42 can include a tube gripping feature such as a plurality of ribs 120 shown in the illustrative drawing. The gripping feature can be of any form, shape, size, type, or number, but will generally protrude to engage with a tube (not shown in FIG. 2). Furthermore the gripping feature can include separate inserts made of various material compositions such as rubber, composite, metal, mixtures thereof or other types that enhance the gripping ability of the tube clamp 30. It is further contemplated that coatings to prevent wear, prevent corrosion and/or enhance gripping ability may be used on the tube collets 40, 42 or elsewhere as desired.

Figure 3:
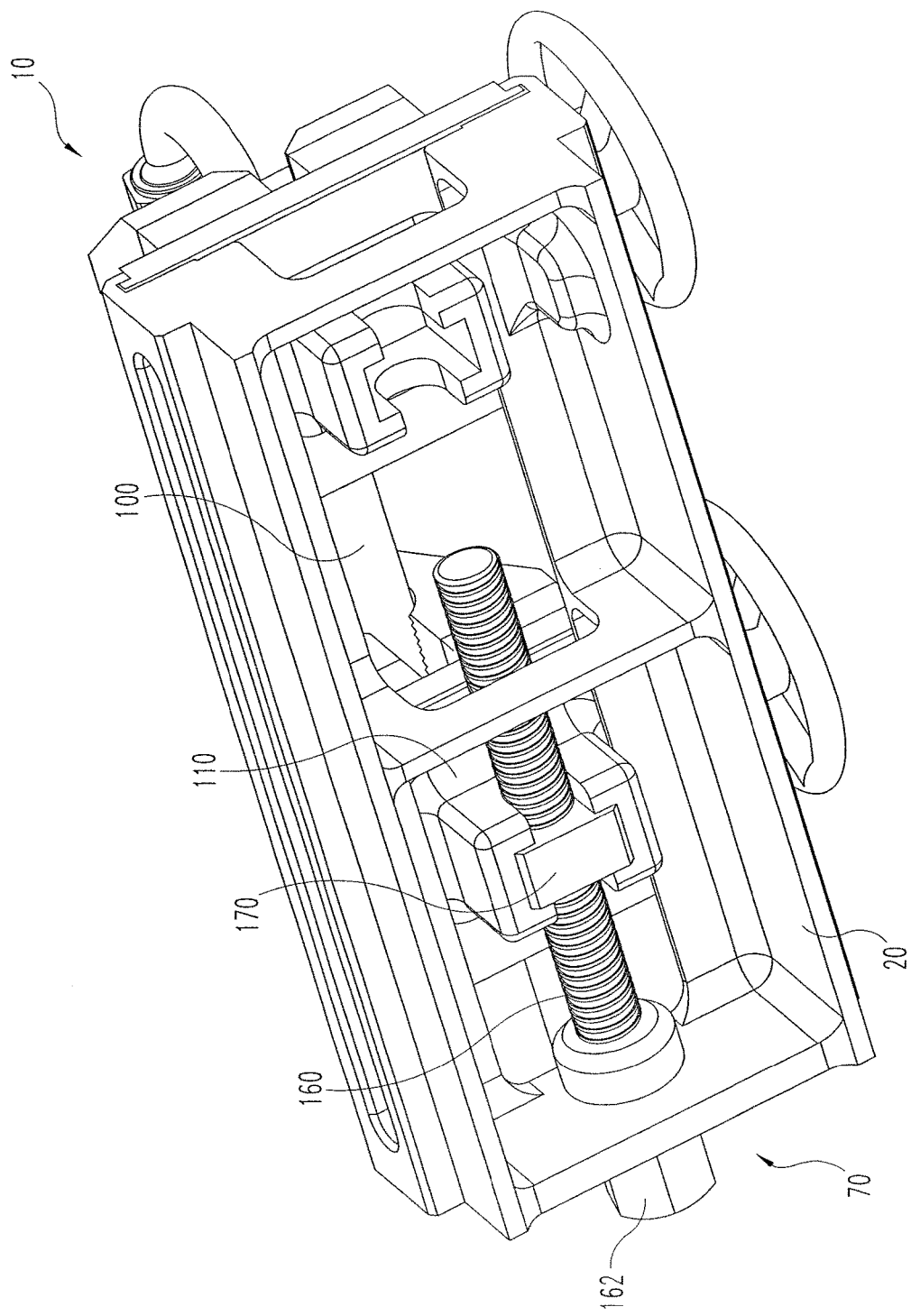
FIG. 3 is a bottom perspective view of the assembly tool of FIG. 1.

Referring now to FIG. 3, the underside of the tube assembly apparatus 10 is shown in perspective. In one exemplary embodiment, the drive actuator 70 can include a threaded drive rod 160 connected to a drive nut 162 as illustrated herein. A drive rod follower 170 can be threadingly engaged with the threaded drive rod 160 such that the drive rod follower 170 will move along the longitudinal length of the base 20 as the drive rod 160 is rotated. The drive rod follower 170 can be connected to a tube clamp platform 110 such that as the drive rod follower 170 moves, the tube clamp platform 110 and tube clamp 30 also move. The drive nut 162 can be rotated via conventional or unconventional means which in turn causes the drive rod follower 170 to rotate in the same direction. The tube clamp platform 110 along with the tube clamp 30 will move longitudinally in one direction along the length of the base 20 when the drive nut 162 is rotated in one direction and will move longitudinally in the opposite direction when the drive nut 70 is turned in the opposing direction. In this exemplary embodiment, the drive rod 160 is connected only to the tube clamp platform 110 and the fitting clamp platform 100 is fixed in position. It should be understood that in other embodiments, the threaded drive rod 160 can extend into a second rod follower (not shown) connected to the fitting platform 100. By adding an optional fitting platform follower with an opposite thread pattern, the tube clamp 30 and fitting clamp 50 will move toward one another or apart from one another as the drive nut 162 is actuated in opposing directions.

Figure 4:
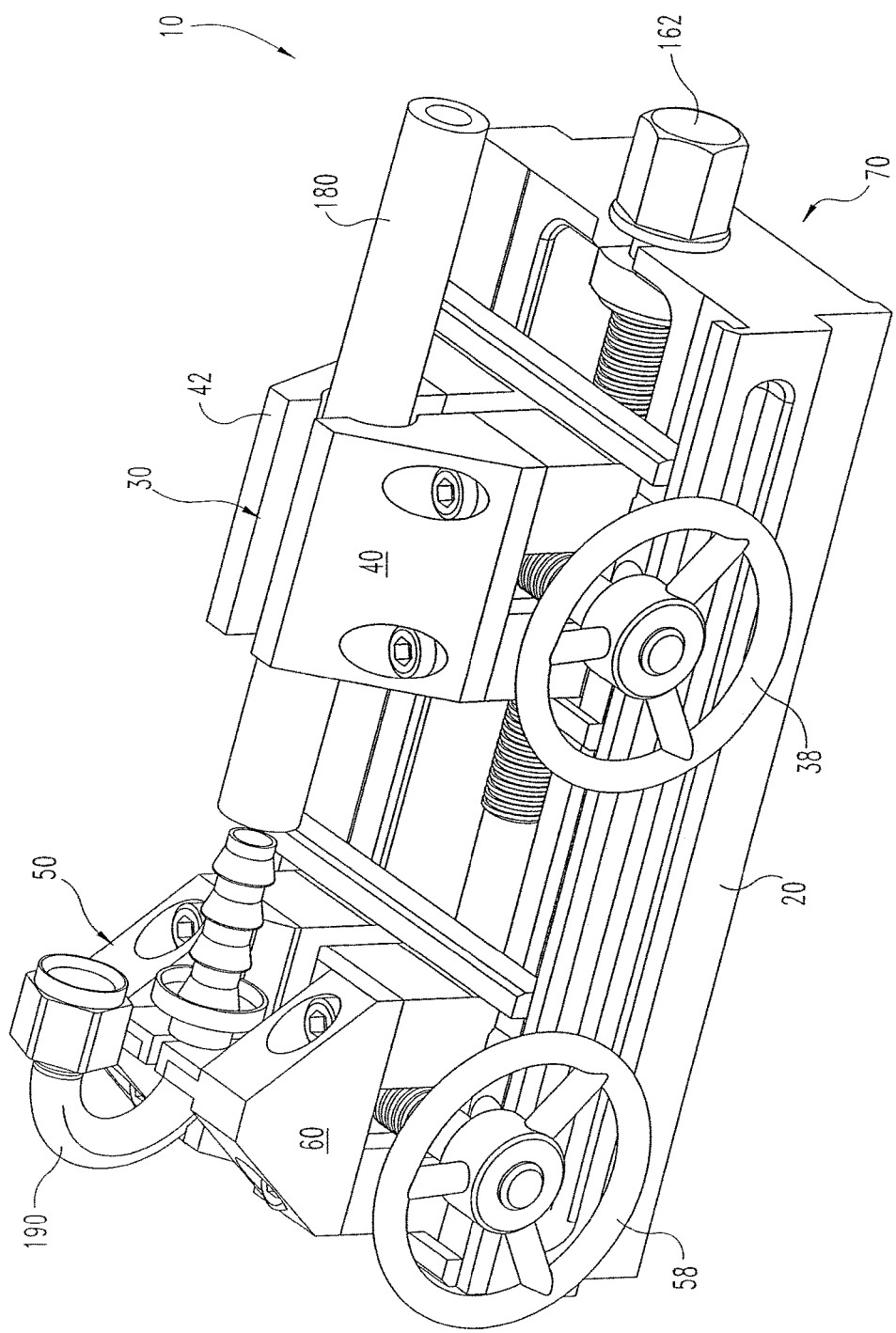
FIG. 4 is a perspective view of the assembly tool of FIG. 1 showing a fitting and a tube positioned within a pair of clamps.

Referring now to FIG. 4, in operation the tube assembly apparatus 10 provides a tube clamp 30 that can releasably engage a tube 180 via rotation of the clamp wheel 38. Similarly, the fitting clamp 50 can releasably engage a fitting 190 via rotation of the clamp wheel 58. Forms of the tube assembly apparatus 10 can accommodate a fitting 190 that have the inlet and outlet of the fitting in a variety of geometric relationships. For example, the inlet and outlet may be arranged collinear or at any other angle relative to one another; for example, but not limited to, they may be arranged at 45°, 90°, 180° relative to one another. As discussed above the present disclosure contemplates the inlet and outlet maybe disposed at any angle relative to one another. An operator can open the tube clamp 30 by rotating the tube clamp wheel 38 one direction, typically in a counter-clockwise direction, but not in all cases. A tube 180 can then be placed within the tube collets 40, 42 and then the tube clamp 30 can be tightened together by reversing the rotation of the tube clamp wheel 38. Similarly, the fitting clamp 50 can be opened by turning the fitting clamp wheel 58 in one direction and then turned in the opposite direction to provide a clamping force on the fitting 190 to hold the fitting 190 in a desired position. Once the tube 180 and fitting 190 are in clamped position, the drive actuator 70 can be actuated via rotation of the drive nut 162 so as to draw the tube 180 and fitting 190 together.

Figure 5:
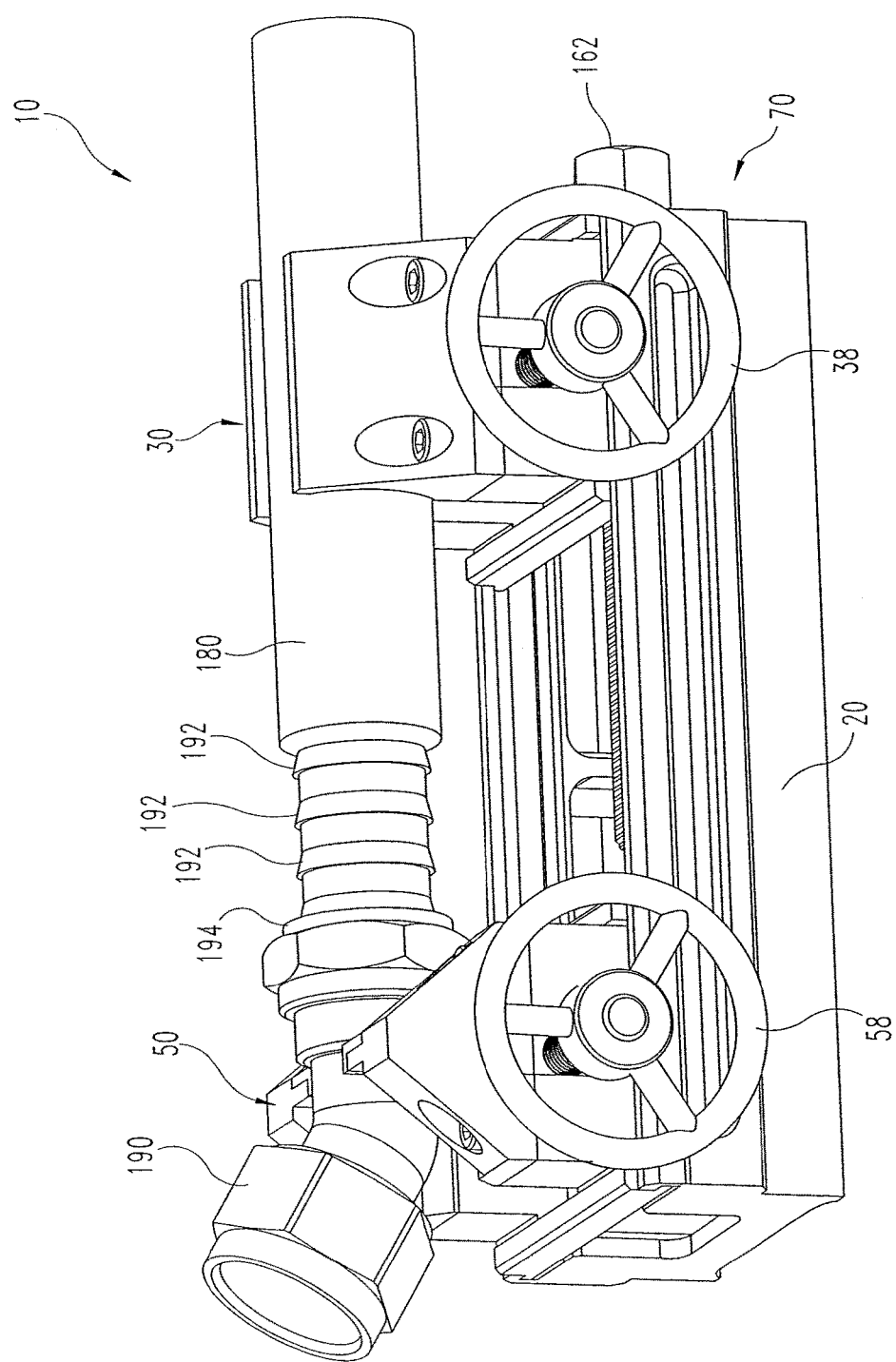
FIG. 5 is a perspective view of the assembly tool of FIG. 4 wherein the tube and fitting have been partially joined together.

FIG. 5 shows the apparatus 10 wherein the tube clamp 30 and/or the fitting clamp 50 have been moved via the drive actuator 70 to positions wherein that the tube 180 and fitting 190 are initially engaged together. In the illustrative drawing, the tube 180 can be drawn over barbs 192 of the fitting 190 until engagement with an abutment wall 194 as is conventional. In this manner a fluid tight coupling between the tube 180 and the fitting 190 is formed. The tube assembly apparatus 10 can be used for a variety of types of tubes or fittings as desired. In the exemplary embodiment, the fitting 190 can have barbs or tangs 192 that extend outwardly from the connector surface to form a tight seal with the inner surface of the tube 180. In other embodiments alternate fitting designs can be utilized. The tube 180 can be made from any type of material desired including but not limited to rubber, synthetic rubber such as neoprene, composite, plastic, metal or combinations thereof. The fittings 190 are typically made of relatively stiff material such as metal, plastic, ceramics or composites and the like, however there are no limitations contemplated on the size, type or material composition of fittings that the tube assembly apparatus 10 can assemble with a tube. As such, any tube and fitting combination that must be pressed together for assembly can be effectively assembled with the apparatus 10. Furthermore, there are no limitations on the method of construction or material selection for apparatus itself. Material selection for the apparatus 10 can include metals, composites, plastics or combinations thereof. Surface coatings can also be used on various portions of the apparatus 10 to reduce wear, reduce corrosion, increase friction or decrease friction, as desired.

In addition, it should be understood that while the illustrative embodiment shows a drive nut 162 with a threaded rod 160 as the actuator to move one or both of the clamps 30, 50, that other types of actuation devices can also be used with the tube assembly apparatus 10 of the present disclosure. For example, a hydraulic ram actuator or pneumatic actuator could be placed in the same location as the threaded drive rod 160 to cause the tube clamp 30 and fitting clamp 50 to move together or apart from one another. Furthermore, one or more electric motors can be used to drive the clamps 30, 50 in longitudinal movement. For embodiments wherein the actuator includes the threaded rod 160 configuration, a rotary tool with a corresponding socket can be used to rotate the drive nut 162. For example, an electric drill, an impact wrench or a pneumatic rotary device can operationally engage the drive nut 162 to provide torque and turn the threaded drive rod 160 in a desired direction to bring the tube 180 and fitting 190 in assembled relationship.

Figure 6:
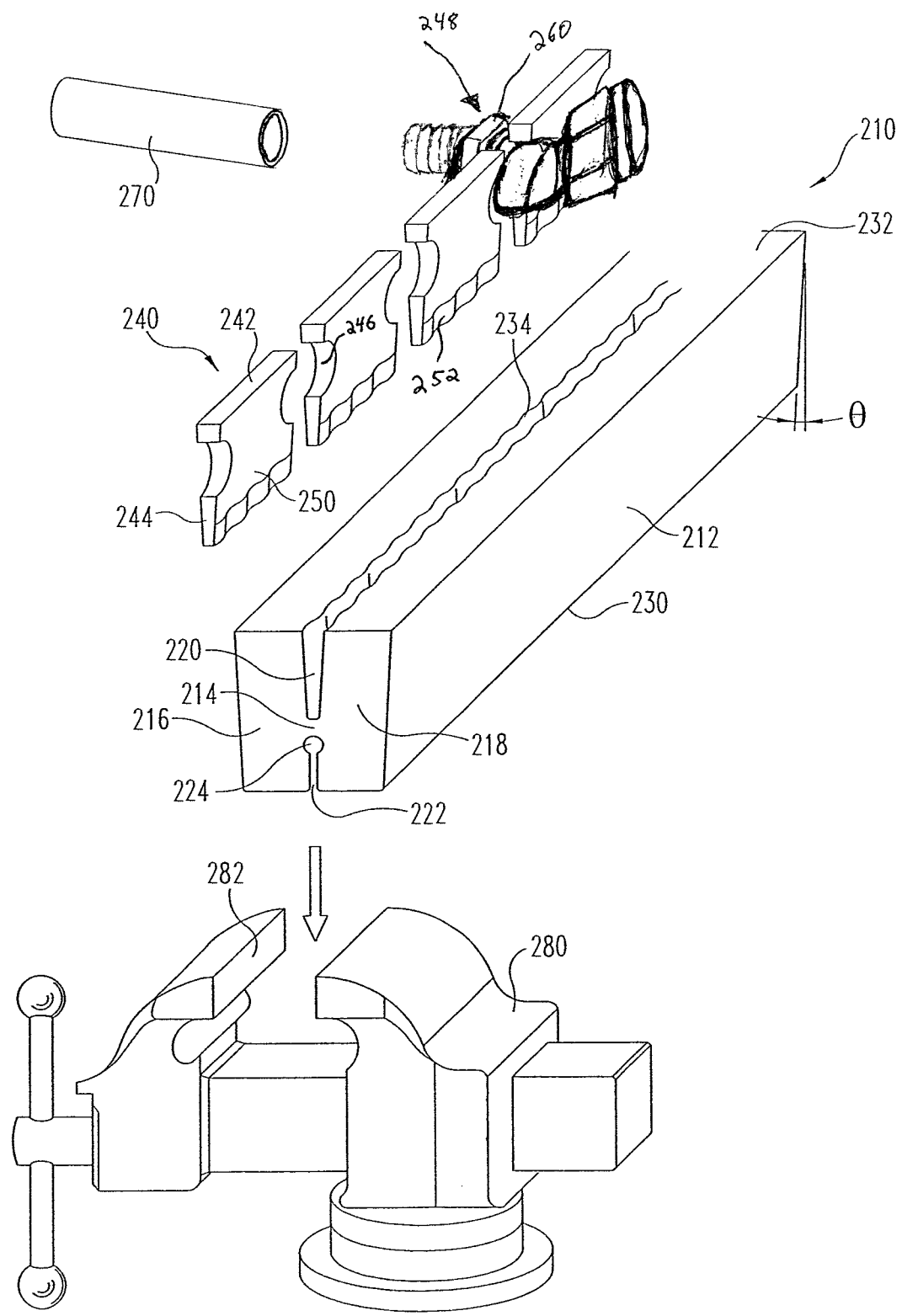
FIG. 6 is an exploded view of an alternate embodiment of a tube assembly tool.

Referring now to FIG. 6, another embodiment of a tube assembly tool 210 is illustrated. The tube assembly tool 210 can include a substantially H-shaped housing 212 with a hinge portion 214 formed between first and second arms 216, 218, respectively. An adapter receiving slot 220 can be formed on one side of the hinge portion 214 between the first arm 216 and the second arm 218. In one form, the adapter receiving slot 220 can be formed with a taper such that the width of the slot 220 increases in proportion to the distance away from the hinge 214. By way of example and not limitation the taper in one embodiment can be between 2 and 4 degrees. Other forms of the present disclosure do not contemplate a tapered adapter receiving slot 220. An actuator slot 222 can be formed on the opposing side of the hinge portion 214 between the first arm 216 and the second arm 218. An optional relief feature 224 is depicted at the leading edge of the slot actuator slot 222. The relief feature 224 can be defined in one form by a circular dimension with a relatively large radius to eliminate stress risers that may cause crack initiation due to repeated actuation of the arms 216, 218 about the hinge 214. The actuation of the arms 216, 218 causes the width of the slots 220 and 222 to increase and decrease as an angle θ changes as will be described in more detail below. It should be apparent that a similar relief feature can be formed at the leading edge of the adapter receiving slot in some embodiments of this disclosure. The H-shaped housing 212 has a lower wall 230 on each arm 216, 218 extending from the actuator slot 222 and an upper wall 232 on each arm 216, 218 extending from the adapter receiving slot 220. A plurality of gripping features 234 can be formed along a portion of the of the adapter receiving slot 220.

The adapter receiving slot 220 is configured to receive a plurality of fitting adapters 240 therein. The fitting adapters 240 cooperate in coupled pairs to hold a fitting or connector 260 in place relative to the housing 212 so that a hose or tube 270 may be connected or otherwise engaged with the fitting 260. Each fitting adaptor 240 has a top portion 242 and opposite sidewalls 244 extending therefrom. Each sidewall 244 can include a concave arcuate portion 246 that in conjunction with an adjacent adaptor 240 form a fitting holding aperture 248 wherein a fitting 260 can be positioned within. In a lower region of the adaptor 240, a root 250 can be configured to engage with the adaptor receiving slot 250 of the housing 212. The root 250 can include adaptor gripping features 252 such as protruding and recessed regions configured to cooperate with the gripping features 234 of the adapter receiving slot 220 to firmly hold the adapters 240 in fixed position relative to the housing 212. The sidewalls 244 can be tapered outward from the bottom of the root 250 to coincide with the taper of the adapter receiving slot 220 in one exemplary embodiment of the present disclosure. Alternatively, the taper of the sidewalls 244 can be more or less than the taper of the adapter receiving slot 220 in other embodiments of the present disclosure. In yet other embodiments neither the root 250 of the adapters 240 nor the adapter receiving slot 250 include tapered portions.

The H-shaped housing 212 and fitting adapters 240 can be made from a variety of different materials depending on the design criteria and application. Materials can include, but are not limited to metals, plastics, composites and combinations thereof. In operation, the arms 216 and 218 can be actuated to dose the gap of the actuator slot 222 which in turn will further open the adaptor receiver slot 220 as the arms 216, 218 pivot about the hinge portion 214 (increasing the angle θ) of the housing 212. After opening the adapter receiving slot 220 the fitting adapters 240 with fittings can be placed within the receiving slot 220. The actuation force on the arms 216, 218 can then be removed which will permit the arms 216, 218 to pivot back and provide a clamping force onto the root 250 of the fitting adapters 240. The amount of force required to actuate the arms 216, 218 will depend on the material selections and the design dimensions of the hinge portion 214. In some applications an operator's hand may provide enough actuation force to generate a desired movement of the arms 216, 218. In other applications, the actuation force can be generated by mere engagement of the root 250 of the fitting adapters 240 into the receiving slot 220 of the housing 212. In other embodiments, a separate tool such as specially designed pliers or a vise may be required to actuate the arms 116, 118. In yet other embodiments, any tool that can be used for such actuation is contemplated by the present disclosure.

Figure 7:
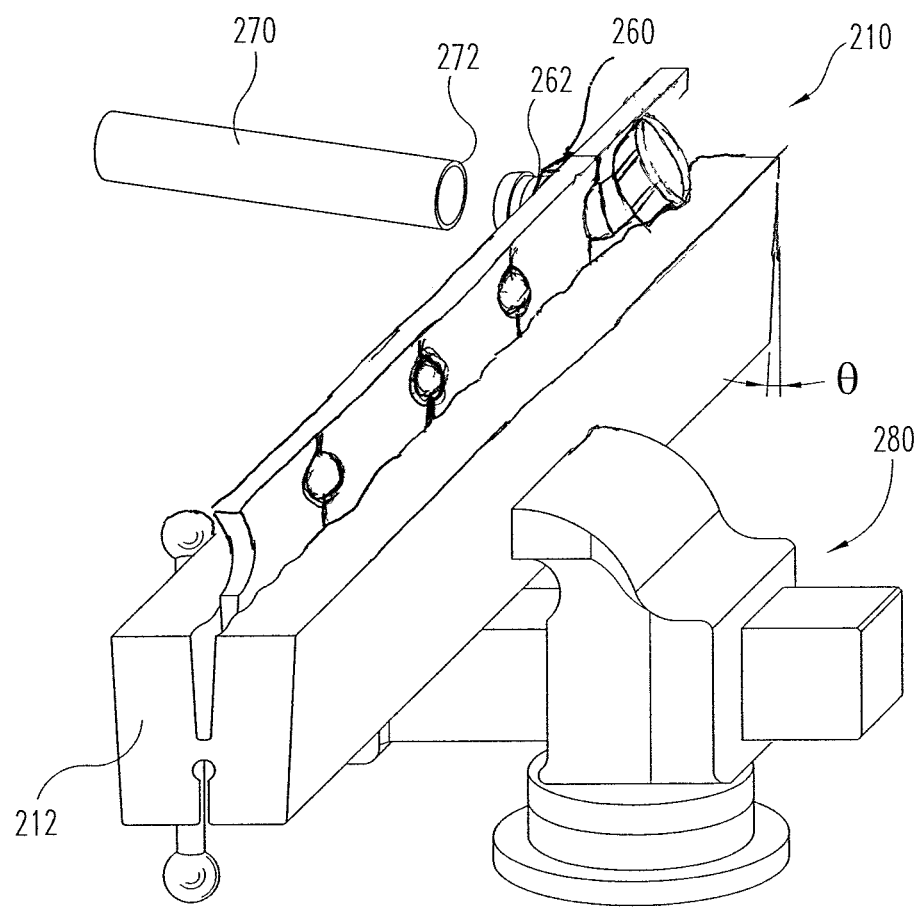
FIG. 7 is perspective view of the tube assembly tool of FIG. 6.

Referring now to FIG. 7, a perspective view of the tube assembly tool 210 with the fittings 260 coupled with the housing 212 and held with a vise 280. In this position, one end 272 of the tubes 270 can be advanced over the barbed end 262 of the fittings 260 to form a final tube assembly.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus comprising:
   a base having a single guide formed along a longitudinal length thereof;
   a fitting clamp coupled to the base along the guide;
   a tube clamp coupled to the base along the guide and spaced apart from the fitting clamp; and
   a drive mechanism operable to move either one or both of the fitting and tube clamps relative to one another by axially sliding one or both of the clamps along the guide of the base until an end of a tube engages an abutment of a fitting and couples the tube with the fitting.

2. The apparatus of claim 1, wherein the drive mechanism includes a threaded rod operably connected to at least one of the tube and fitting clamps; and a drive nut operable for rotating the threaded rod and moving at least one of the tube and fitting clamps along the guide of the base.

3. The apparatus of claim 2, wherein the drive nut is configured for connection with a drive socket for a rotary drive tool.

4. The apparatus of claim 1, wherein the drive mechanism is operable with at least one of a pneumatic actuator, a hydraulic actuator and an electric actuator.

5. The apparatus of claim 1, further comprising:
   an interchangeable fitting collet coupled with the fitting clamp to hold a fitting in a desired position relative to the fitting clamp.

6. The apparatus of claim 5, wherein the fitting collet includes a two piece construction connectable to opposing sides of the fitting clamp.

7. The apparatus of claim 1, further comprising an interchangeable tube collet coupled with the tube clamp to hold a tube in a desired position relative to the tube clamp.

8. The apparatus of claim 7, wherein the tube collet includes a two piece construction connectable to opposing sides of the tube clamp.

9. The apparatus of claim 7, wherein the tube collet includes gripping ribs extending outward from a collet surface.

10. The apparatus of claim 1, further comprising a rotatable wheel connected to each of the fitting and tube clamps operable to move opposing pawls of each clamp relative to one another.

11. The apparatus of claim 1, wherein the tube and fitting clamps support interchangeable collets having variations in size and shape.

12. The apparatus of claim 1, wherein the guide of the base forms a substantially linear path.

13. The apparatus of claim 1, further comprising:
   an interchangeable fitting collet insert attachable to opposing sides of a fitting collet.

14. A tube assembly system comprising:
   a pair of clamps coupled to a housing along a single path defined along a longitudinal length of the housing, the clamps operable for imparting a clamping force onto a tube fitting and a tube, respectively;
   wherein each clamp of the pair of clamps include first and second pawls configured to move relative to one another in a transverse direction relative to the longitudinal length of the housing;
   wherein each of the clamps are adapted to slide relative to one another along the longitudinal path of the housing during a coupling operation; and
   an actuation mechanism operable for moving at least one of the clamps toward the other clamp such that the tube and tube fitting are slidingly coupled together without rotation of either the tube or tube fitting.

15. The tube assembly system of claim 14, wherein the actuation mechanism is operable to drive a relatively flexible tube over a relative rigid connection portion of the fitting.

16. The tube assembly system of claim 14 further comprising: an interchangeable fitting collet and tube collet attachable to one of the clamps, respectively.

17. The tube assembly system of claim 16 further comprising: an interchangeable fitting collet insert connectable to the fitting collet.

18. The tube assembly system of claim 17 further comprising:
   a protruding element extending outward from the fitting collet insert; and
   an aperture formed in the fitting collet adapted to receive the protruding element of the fitting collet insert.

19. The apparatus of claim 1, wherein the drive mechanism is operable to move each of the fitting and tube clamps relative to one another along the guide of the base.

* * * * *